United States Patent
Iyengar et al.

(10) Patent No.: US 12,462,812 B2
(45) Date of Patent: Nov. 4, 2025

(54) RELATIONSHIP-DRIVEN VIRTUAL ASSISTANT

(71) Applicant: INTERNATIONAL BUSINESS MACHINES CORPORATION, Armonk, NY (US)

(72) Inventors: Ashok Kumar Iyengar, Encinitas, CA (US); Trudy L. Hewitt, Cary, NC (US); Venkata Vishwanath Gadepalli, Apex, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 18/061,499

(22) Filed: Dec. 5, 2022

(65) Prior Publication Data
US 2024/0185862 A1    Jun. 6, 2024

(51) Int. Cl.
*G10L 17/22* (2013.01)
*G10L 13/027* (2013.01)
*G10L 25/54* (2013.01)

(52) U.S. Cl.
CPC ............ *G10L 17/22* (2013.01); *G10L 13/027* (2013.01); *G10L 25/54* (2013.01)

(58) Field of Classification Search
CPC ....... G10L 13/027; G10L 25/54; G10L 17/00; G06F 16/9535; G06F 16/3329; G06Q 50/01
See application file for complete search history.

(56) References Cited

U.S. PATENT DOCUMENTS

| | | | |
|---|---|---|---|
| 8,156,060 B2 | 4/2012 | Borzestowski |
| 9,313,646 B2 | 4/2016 | Baldwin |
| 9,634,855 B2 | 4/2017 | Poltorak |
| 9,864,431 B2 | 1/2018 | Keskin |

(Continued)

OTHER PUBLICATIONS

Author Unknown, "Create an Alexa skill using Watson Assistant and OpenWhisk", https://github.com/IBM/alexa-skill-watson-assistant, Accessed Aug. 17, 2022, pp. 1-24.

(Continued)

*Primary Examiner* — Bhavesh M Mehta
*Assistant Examiner* — Jangwoen Lee
(74) *Attorney, Agent, or Firm* — Lily Neff

(57) ABSTRACT

A computer-implemented method, a computer system and a computer program product generate a query response in an environment based on predicted relationships between users. The method includes capturing a question with a device in the environment, where the question includes a speaking voice and is selected from a group consisting of: video data, audio data and text data. The method also includes identifying the speaker of the question based on the speaking voice. The method further includes determining a relationship between the question and each user interaction in a database of user interactions, where each user interaction is associated with a user. In addition, the method includes selecting a response from the database of user interactions based on the relationship. Lastly, the method includes transmitting the response to the speaker of the question in the environment, where the transmission of the response uses a voice of the user.

20 Claims, 2 Drawing Sheets

(56) References Cited

U.S. PATENT DOCUMENTS

| | | | | |
|---|---|---|---|---|
| 10,152,719 | B2* | 12/2018 | Navaratnam | G10L 21/10 |
| 10,628,635 | B1* | 4/2020 | Carpenter, II | G10L 13/02 |
| 10,878,174 | B1* | 12/2020 | Vontobel | G06Q 10/06398 |
| 2015/0111607 | A1 | 4/2015 | Baldwin | |
| 2016/0196491 | A1* | 7/2016 | Chandrasekaran | G06F 16/26 |
| | | | | 706/50 |
| 2017/0308905 | A1 | 10/2017 | Navaratnam | |
| 2017/0329404 | A1 | 11/2017 | Keskin et al. | |
| 2019/0005024 | A1* | 1/2019 | Somech | H04L 67/14 |
| 2019/0156222 | A1* | 5/2019 | Emma | G06N 5/041 |
| 2019/0220727 | A1 | 7/2019 | Dohrmann | |
| 2022/0036013 | A1* | 2/2022 | Liu | G10L 15/16 |

OTHER PUBLICATIONS

Author Unknown, "Gatebox", Gatebox Inc.—Gatebox, https://www.gatebox.ai/en, Accessed Aug. 17, 2022, pp. 1-6.

Author Unknown, "Gaze and commit", Gaze and commit—Mixed Reality | Microsoft Docs, https://docs.microsoft.com/en-us/windows/mixed-reality/design/gaze-and-commit#composite-gestures, Aug. 4, 2022, pp. 1-15.

Author Unknown, "speech recognition", Speech recognition—Windows apps | Microsoft Docs, https://docs.microsoft.com/en-us/windows/apps/design/input/speech-recognition, Jun. 24, 2021, pp. 1-13.

Author Unknown, "Voice input", Voice input—Mixed Reality | Microsoft Docs, https://docs.microsoft.com/en-us/windows/mixed-reality/design/voice-input, Mar. 7, 2022, pp. 1-16.

Author Unknown, "Watson Assistant: Intelligent virtual agent", Virtual Agent—IBM Watson Assistant IBM, https://www.ibm.com/products/watson-assistant, Accessed Aug. 17, 2022, pp. 1-13.

Johnson, "Humanizing digital communications", Humanizing digital communications | IBM, https://www.ibm.com/case-studies/2mee/, Accessed Aug. 17, 2022, pp. 1-14.

KH, "3 Efficient Ways to Supply Your App with a Virtual Assistant", How to Create Virtual Assistant Apps like Siri and Google Assistant, https://www.cleveroad.com/blog/how-to-create-virtual-assistant-apps-like-siri-and-google-assistant/, Updated Aug. 12, 2022, pp. 1-25.

Koetsier, "This No-Headset Holographic Display Enables 3D Presence, Remotely", Consumer Tech, https://www.forbes.com/sites/johnkoetsier/2021/09/11/this-no-headset-holographic-display-enables-3d-presence-remotely/?sh=7c8cea29490a, Sep. 11, 2021, pp. 1-7.

Kramar et al. "Augmented Reality-assisted Cyber-Physical Systems of Smart University Campus.", https://ieeexplore.ieee.org/document/9321951, 2020 IEEE 15th International Conference on Computer Sciences and Information Technologies (CSIT), vol. 2. IEEE, Sep. 23-26, 2020, pp. 309-313.

* cited by examiner

RELATIONSHIP-DRIVEN VIRTUAL ASSISTANT

BACKGROUND

Embodiments relate generally to the field of virtual assistants and, more specifically, to responding to queries based on predicted relationships between users.

In today's digital ecosystem, a virtual assistant may be employed in spaces such as offices or homes to answer queries posed by users in the space. As an example, a user may ask a question about the weather and the question may be researched using the Internet and answered using a digital voice response. In addition, it may be common to capture interactions among users in these spaces, such as a person searching for an item who asks where the item is and being answered by someone else within the space, and the relationship between the users in the space may be important to the effectiveness of the response.

SUMMARY

An embodiment is directed to a computer-implemented method for generating a query response in an environment based on predicted relationships between users. The method may include capturing a question with a device in the environment, where the question includes a speaking voice and is selected from a group consisting of: video data, audio data and text data. The method may also include identifying a speaker of the question based on the speaking voice. The method may further include determining a relationship between the question and each user interaction in a database of user interactions, where each user interaction is associated with a user. In addition, the method may include selecting a response from the database of user interactions based on the relationship. Lastly, the method may include transmitting the response to the environment, where transmission of the response uses a voice of the user.

In another embodiment, the selecting the response from the database of user interactions may include calculating a confidence score for each user interaction in the database of user interactions based on the relationship and the user associated with the user interaction and selecting a user interaction as the response when the confidence score for the user interaction is above a threshold.

In a further embodiment, the method may include monitoring an interaction between the speaker of the question and the response and updating the database of user interactions based on the interaction between the speaker of the question and the response.

In yet another embodiment, the method may include adding the question as a user interaction to the database of user interactions, where the user interaction is associated with the speaker of the question, when the relationship between the question and a user interaction in the database is not determined.

In still another embodiment, the determining the relationship between the question and each user interaction in the database of user interactions may include determining the relationship between the speaker of the question and the user associated with the user interaction.

In a further embodiment, the transmission of the response may use a hologram of the user speaking in the voice of the user.

In yet another embodiment, the transmission of the response may use an audible response in the voice of the user.

In addition to a computer-implemented method, additional embodiments are directed to a computer system and a computer program product for generating a query response in an environment based on predicted relationships between users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The proliferation of virtual assistants in today's digital ecosystem may enable users in offices and homes to ask a variety of questions and receive answers almost instantaneously. For example, a user in a home may want to know about the weather forecast and ask an audible question. A virtual assistant may capture the question, convert the speech to text, and conduct a search via the Internet to retrieve a weather forecast in the local area of the user. The virtual assistant may then be programmed to respond to the user in an appropriate manner, such as text on a screen, perhaps a mobile device in the user's possession, or audibly through a speaker using speech. This environment may also facilitate the capture of everyday interactions between users in the office or home, such as conversations or questions that one user may pose, and a second user may answer. The captured information may be collected into a database, or some kind of indexed storage, and used to train a machine learning model to extend the function of the virtual assistant to everyday questions and answers. One problem with this sort of extension is the personalization of responses, where answers are typically in a generic computer voice or, if a hologram were to be used, a generic hologram that may answer the question in a neutral way that is not familiar to the user that posed the question.

It may therefore be useful to provide a method or system that may record personalized voices whenever questions are posed in an open space, such as a home or office, and learns the answers to the questions along with a determination of a relationship between the users in the space. For instance, the method or system may record an interaction where an elderly user in a home environment has lost an item and another user, perhaps an adult child or other caregiver that may be known to the elderly user, answers the question by saying the location of the lost item. In this case, if the situation were repeated later and no one is in the home to give the location, the system or method, having recorded the voice in the first instance, may respond to the user with an audio clip of the previous response, or use the voice or image of the responding user to provide the location of the item. Such a response would provide the elderly user with a familiar voice or image and reassure the elderly user about the answer, rather than a neutral computerized voice. Such a system or method may enhance the functionality of virtual assistants and increase the proliferation of virtual assistants in the commercial market.

Figure 1:
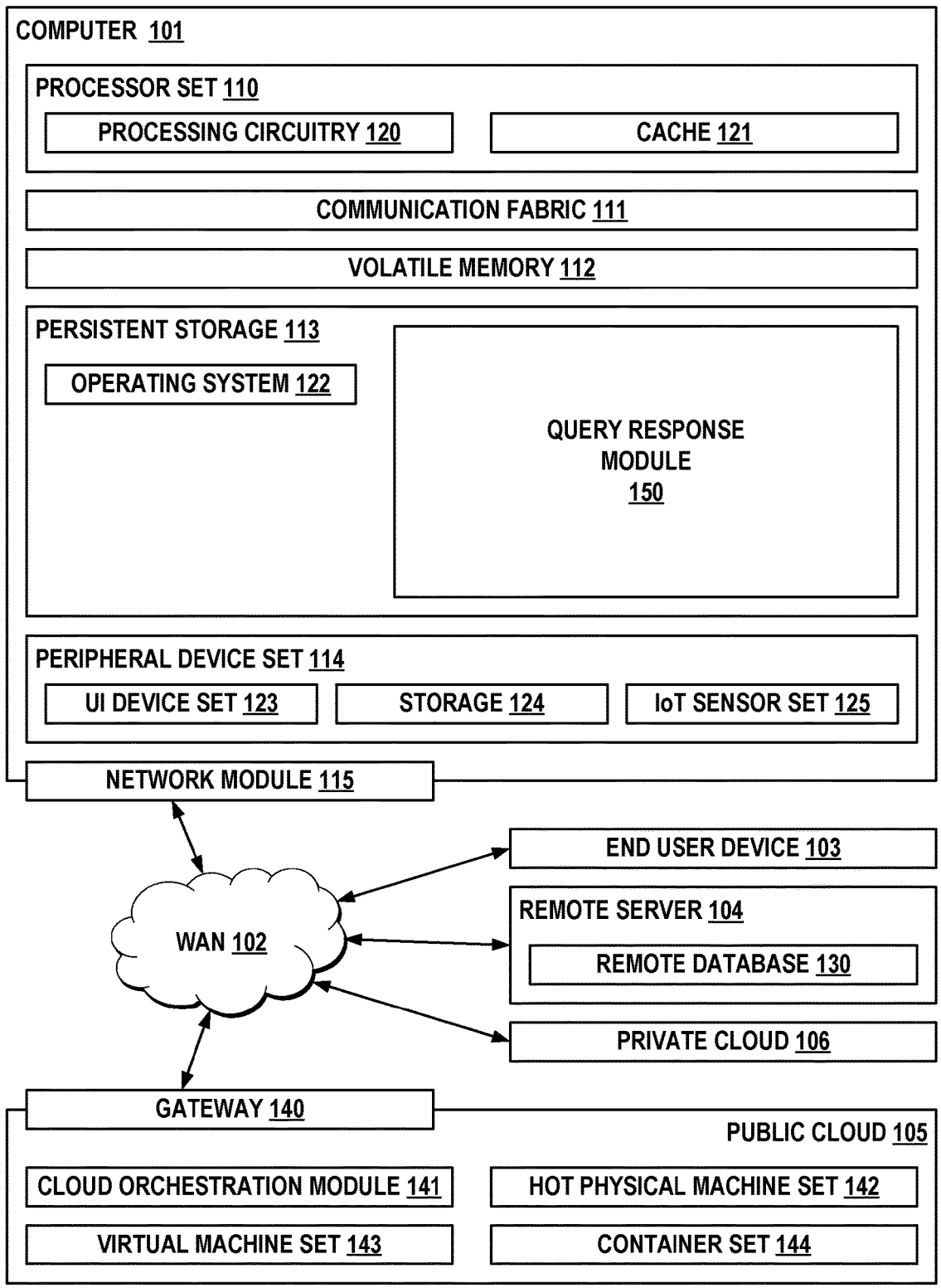
FIG. 1 depicts a block diagram of an example computer system in which various embodiments may be implemented.

Referring to FIG. 1, computing environment 100 contains an example of an environment for the execution of at least some of the computer code involved in performing the inventive methods, such as query response module 150. In addition to query response module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and query response module 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in query response module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in query response module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to generate personalized query responses based on predicted relationships between users. In particular, the query response module 150 may provide responses to questions posed by users by capturing spoken audio in an environment using an appropriate device and identifying the speaker with speech recognition algorithms. The module 150 may then search a database of user interactions that has been compiled for the identified user in an environment such as an office or home and determine a relationship between the question and user interactions in the database, as well as how the speaker of the question is related to the user that may be associated with the user interactions in the database, including whether certain associated users may be the best person to answer the question. At this stage, the module 150 may select a response from the database of user interactions that is associated with the best potential user. It should be noted that the database of user interactions may include the determination of relationships and/or related users mentioned herein, as well as an association between users. Also, the content of the database may include text of the questions and answers or may alternatively include audio or video of the actual answer, such that the voice of each user of the system may be recorded for use later in the process. Once the best response is selected, the module 150 may transmit the selected response to the user that posed the question in the voice of the related user, either in the form of an audio clip or, in a preferred embodiment, as a hologram that may be voiced by the related user. One of ordinary skill in the art will recognize that the module 150 may be manifested in many forms, including as an enhancement to an existing virtual assistant or as a separate standalone application.

Figure 2:
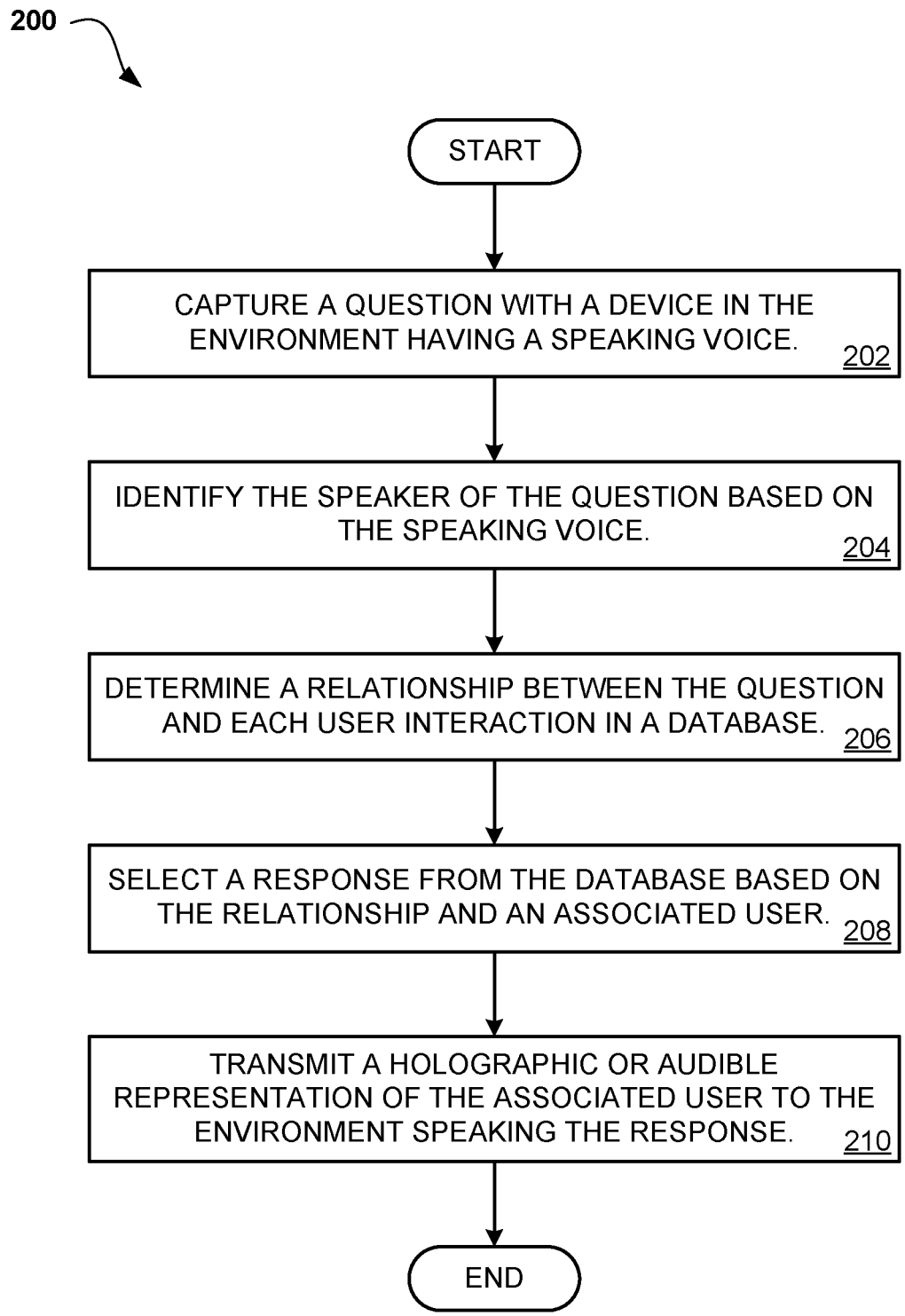
FIG. 2 depicts a flow chart diagram for a process that generates query responses based on predicted relationships between users according to an embodiment.

Referring to FIG. 2, an operational flowchart illustrating a process 200 that generates personalized query responses based on predicted relationships between users is depicted according to at least one embodiment. At 202, a voice-enabled edge device such as a microphone may be used to capture spoken audio that is in proximity to the device in an environment. For example, in a home environment, a user may be searching for an item and ask a question such as "where are my keys?" or "where is the flour?". In an embodiment, the microphone may be in an "always-listening" mode, such that no trigger is required to begin audio capture and/or recording. The microphone may also, at the option of any user in the environment, be switched out of an "always-listening" mode (e.g., have the "always-listening" mode turned off). In another embodiment, the microphone being used by the module 150 may be connected to a smartphone being carried by a user in the environment and used to actively capture user interactions in the proximity of the device. If a user interaction is occurring in an open space such as a living room, or collaborative work area in an office setting, a microphone that may have been mounted in the space or placed on a table and is connected to a virtual assistant system may capture the audio. One of ordinary skill in the art will understand that conversations occur in many environments and microphones may be placed in different ways that are appropriate to that environment. In addition, the device that captures the audio may also process the audio and communicate with a cloud server, but it is not required that all these steps occur in one device at the furthest edge of the network. The audio that is captured at this step may be stored to allow for a processing buffer at further steps in the process.

It should be noted that all collection of information from a user or any video, audio or text that may personally identify a human user or is sensitive in any other way requires the informed consent of all people whose information may be collected and analyzed by query response module 150. Consent may be obtained in real time or through a prior waiver or other process that informs a subject that their information may be captured by a device or other process and that the information may be used to determine a relationship with other users and generate a spoken response to subsequent queries. The information owner is free to decide at any time to revoke consent for use of sensitive information as these settings are permanently retained to keep the query response module 150 updated with the latest information and also allow the owner of the information complete control over their informed consent to use sensitive information in the process described herein. The consent described here may also refer to allowing some, or any, data relating to the information owner from being sent to a local server, cloud server or any other location. The owner has complete control on the transmission of information that may be sensitive or personally identify the owner of the information. It should also be appreciated that while the virtual assistant and query response module 150 are not restricted to home or office environments, the collection of user interactions is required to be relevant to a user or limited group of users that may be related to the speaker of a question and informed consent of any and all users in the environment is always required prior to the collection of user interactions that may be included in the database.

At 204, the user asking the question may be identified using speech recognition algorithms that may analyze tone of speech, voice print or voice quality for comparison to a user interaction database that may contain prior interactions between users within the environment, including identification of users. The database of user interactions may consist of information that has been recorded over time and built by the process prior to the instant question being asked. The database may contain audio, video or text questions and answers that have been obtained over time in the environment as users interact with one another with or without a virtual assistant taking any action and this information may be indexed by the question asked, an answer that has been given and may also be associated with specific users. As an example, if a first user asks "where are my keys?" and a second user answers "look in the foyer on the table, where you always leave them," the first and second users may be identified and then the question may be associated with the first user and the answer may be associated with the second user, such that a relationship between the question and answer, as well as the first and second user, may be determined as described herein. It should be noted that the database of user interactions may include the text of the question and answers but, because the voices of users are used in the process 200, the database may also include video or audio clips of the actual questions and answers that may be captured for the users in the environment.

If a user cannot immediately be identified from the database, the process may request feedback from human users for manual identification, including but not limited to configuration settings with a virtual assistant system for the environment. Once the user has been identified manually, the question may be associated with the user and added to the database of user interactions.

At 206, a relationship may be determined between the question that has been asked and captured and the user interactions contained within the database of user interactions, with the goal of finding the best response to the question. Included in this relationship may be the connection of the identified speaker of the question to users that may be associated with the user interactions in the database.

In an embodiment, a supervised machine learning model may be trained to predict the relationship between the question, including the speaker that asked the question, and the user interactions stored in the database, which may include an association to other users who have a pre-existing relationship with the speaker. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include any prior interactions that may have occurred between users, including but not limited to questions and answers that may be obtained during the process 200. The training data may take the form of video or audio of users interacting with each other or may be obtained within user profiles or other settings that may be manually configured by any user. The training data may be collected from a single interaction or pair of users, e.g., the example above of one user searching for an item in a home and another user providing the answer or from multiple profiles, e.g., a social media profile and a gaming profile that may contain similar information about a specific user. The prediction results may be stored in a database, which may or may not be the same as the database or indexed storage described above, so that the data is most current, and the output would always be up to date.

At 208, a response that may be considered the best for the question that has been captured may be selected from the database based on the determined relationship and the content of the user interactions that may be included in the database. It is important to note that both the relationship between users, the speaker of the question and the user associated with a user interaction, as well as the relationship of the user interaction to the question will be considered at this step. For example, a child may ask a parent where the dog leash should be stored after they are done walking the dog. In this example, the module 150 may have previously recorded an exchange between the parent and other siblings, so there is a stored user interaction within the database pertaining to the specific question (spoken by a child) to a parent associated with the answer. The relationship may be confirmed at this point between the question and the answer, as well as the relationship between users (the parent and child). At this point, a confidence score may be assigned to each user interaction that gets through this initial filter. The question being asked by the speaker may be evaluated against the relationship mapping and historic interactions to provide a confidence ranking as to what the emulated response from targeted responder would be. This allows for a scoring, or quantitative numbering metric, to be produced. For example, if the confidence score calculation produced a number of 92%, the system would engage if the threshold were set to a 90% positive confirmation setting for this particular example. As such, if the score surpasses the threshold, then the process 200 may select that user interaction as the best response to transmit back to the speaker, as described below. In an embodiment, a machine learning model, such as what is used in 206 with respect to predicting relationships, may also be trained to predict the confidence score as described. This prediction may or may not be included with the above prediction of relationships between users or questions and answers.

At 210, the selected response may be transmitted to the environment in the voice of the user associated with the response. In a preferred embodiment, the transmission of the selected response may use a visual representation, such as a hologram of the user that speaks in the voice of the user or a virtual arrow that may appear over a location while the voice of the user speaks or may be an audio-only response. The selected response may be itself an audio recording of the user but this is not required as the module 150 may convert the text of the response to speech and use an archived recording of the user's voice to transmit the selected response. The speaker may choose, through pre-configured settings or by an instant prompt from the module 150, what form the transmission of the selected response may take.

In addition to transmitting the best response to the speaker, the process 200 may also request feedback from the speaker as to whether the response that has been transmitted was helpful or whether the user whose voice that has been used for the transmission and who has been emulated at this step is actually the best choice. Based on the feedback received, the process 200 may adjust the machine learning models and confidence scores to include or exclude user interactions from consideration as responses to be transmitted in the future. The same feedback mechanism may be used by the process 200 to adjust the threshold as necessary to fine tune the calculation of confidence score.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a query response in an environment based on predicted relationships between users, the computer-implemented method comprising:
　　capturing a question with a device in the environment, wherein the question includes a speaking voice and is selected from a group consisting of: video data, audio data and text data;
　　identifying a speaker of the question based on the speaking voice;
　　using a supervised machine learning model, generating a relationship map based on historic interactions associated with a user and other related information stored in a database;
　　analyzing, using the supervised machine model having a speech recognition algorithm, a tone of speech, voice print or voice quality for comparison to a previous user interaction stored in said database, wherein said stored information in said database has been recorded over time and contains audio, video and/or text questions and answers previously obtained;
　　determining a relationship between the question and each user interaction based on the relationship map generated;
　　selecting a response from the database of user interactions based on the relationship; and
　　transmitting the response to the environment, wherein transmission of the response uses a voice of the user.

2. The computer-implemented method of claim 1, wherein the selecting the response from the database of user interactions further comprises:
　　calculating a confidence score for each user interaction in the database of user interactions based on the relationship and the user associated with a user interaction; and
　　selecting the user interaction as the response when the confidence score for the user interaction is above a threshold.

3. The computer-implemented method of claim 1, further comprising:
　　monitoring an interaction between the speaker of the question and the response; and
　　updating the database of user interactions based on the interaction between the speaker of the question and the response.

4. The computer-implemented method of claim 1, further comprising
　　adding the question as the user interaction to the database of user interactions, wherein the user interaction is associated with the speaker of the question, when the relationship between the question and the user interaction in the database is not determined.

5. The computer-implemented method of claim 1, wherein the determining the relationship between the question and each user interaction in the database of user interactions includes determining the relationship between the speaker of the question and the user associated with the user interaction.

6. The computer-implemented method of claim 1, wherein the transmission of the response uses a hologram of the user speaking in the voice of the user.

7. The computer-implemented method of claim 1, wherein the transmission of the response uses an audible response in the voice of the user.

8. A computer system for generating a query response in an environment based on predicted relationships between users, the computer system comprising:
　　one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
　　capturing a question with a device in the environment, wherein the question includes a speaking voice and is selected from a group consisting of: video data, audio data and text data;
　　identifying a speaker of the question based on the speaking voice;
　　using a supervised machine learning model, generating a relationship map based on historic interactions associated with a user and other related information stored in a database;
　　analyzing, using the supervised machine model having a speech recognition algorithm, a tone of speech, voice print or voice quality for comparison to a previous user interaction stored in said database, wherein said stored information in said database has been recorded over time and contains audio, video and/or text questions and answers previously obtained;
　　determining a relationship between the question and each user interaction based on the relationship map generated;
　　selecting a response from the database of user interactions based on the relationship; and transmitting the response to the environment, wherein transmission of the response uses a voice of the user.

9. The computer system of claim 8, wherein the selecting the response from the database of user interactions further comprises:
　　calculating a confidence score for each user interaction in the database of user interactions based on the relationship and the user associated with the user interaction; and
　　selecting the user interaction as the response when the confidence score for the user interaction is above a threshold.

10. The computer system of claim 8, further comprising:
　　monitoring an interaction between the speaker of the question and the response; and
　　updating the database of user interactions based on the interaction between the speaker of the question and the response.

11. The computer system of claim 8, further comprising
　　adding the question as the user interaction to the database of user interactions, wherein the user interaction is associated with the speaker of the question, when the relationship between the question and the user interaction in the database is not determined.

12. The computer system of claim 8, wherein the determining the relationship between the question and each user interaction in the database of user interactions includes determining the relationship between the speaker of the question and the user associated with the user interaction.

13. The computer system of claim 8, wherein the transmission of the response uses a hologram of the user speaking in the voice of the user.

14. The computer system of claim 8, wherein the transmission of the response uses an audible response in the voice of the user.

15. A computer program product for generating a query response in an environment based on predicted relationships between users, the computer program product comprising:
   a computer-readable storage device having program instructions embodied therewith, the program instructions executable by a processor to cause the processor to perform a method comprising:
   capturing a question with a device in the environment, wherein the question includes a speaking voice and is selected from a group consisting of: video data, audio data and text data;
   identifying a speaker of the question based on the speaking voice;
   using a supervised machine learning model, generating a relationship map based on historic interactions associated with a user and other related information stored in a database;
   analyzing, using the supervised machine model having a speech recognition algorithm, a tone of speech, voice print or voice quality for comparison to a previous user interaction stored in said database, wherein said stored information in said database has been recorded over time and contains audio, video and/or text questions and answers previously obtained;
   determining a relationship between the question and each user interaction based on the relationship map generated;
   selecting a response from the database of user interactions based on the relationship; and transmitting the response to the environment, wherein transmission of the response uses a voice of the user.

16. The computer program product of claim 15, wherein the selecting the response from the database of user interactions further comprises:
   calculating a confidence score for each user interaction in the database of user interactions based on the relationship and the user associated with a user interaction; and
   selecting the user interaction as the response when the confidence score for the user interaction is above a threshold.

17. The computer program product of claim 15, further comprising:
   monitoring an interaction between the speaker of the question and the response; and
   updating the database of user interactions based on the interaction between the speaker of the question and the response.

18. The computer program product of claim 15, further comprising
   adding the question as the user interaction to the database of user interactions, wherein the user interaction is associated with the speaker of the question, when the relationship between the question and the user interaction in the database is not determined.

19. The computer program product of claim 15, wherein the determining the relationship between the question and each user interaction in the database of user interactions includes determining the relationship between the speaker of the question and the user associated with the user interaction.

20. The computer program product of claim 15, wherein the transmission of the response uses a hologram of the user speaking in the voice of the user.

* * * * *